(12) United States Patent
Ishikawa

(10) Patent No.: US 12,090,812 B2
(45) Date of Patent: Sep. 17, 2024

(54) CONSTRUCTION MACHINE

(71) Applicant: Yanmar Power Technology Co., Ltd., Osaka (JP)

(72) Inventor: Yoshihisa Ishikawa, Chikugo (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 324 days.

(21) Appl. No.: 17/434,989

(22) PCT Filed: Feb. 26, 2020

(86) PCT No.: PCT/JP2020/007753
§ 371 (c)(1),
(2) Date: Aug. 30, 2021

(87) PCT Pub. No.: WO2020/179580
PCT Pub. Date: Sep. 10, 2020

(65) Prior Publication Data
US 2022/0144040 A1 May 12, 2022

(30) Foreign Application Priority Data
Mar. 1, 2019 (JP) .................................. 2019-037178

(51) Int. Cl.
*B60H 1/00* (2006.01)
*B62D 21/18* (2006.01)
(Continued)

(52) U.S. Cl.
CPC ..... *B60H 1/00378* (2013.01); *B60H 1/00564* (2013.01); *B62D 21/18* (2013.01);
(Continued)

(58) Field of Classification Search
CPC ...... B62D 21/18; B62D 21/186; B62D 33/06; B62D 33/0617; E02F 9/0858; E02F 9/16;
(Continued)

(56) References Cited

U.S. PATENT DOCUMENTS

2003/0234559 A1 12/2003 Dykman
2009/0317187 A1* 12/2009 Bohme .............. B62D 33/0633
404/90
(Continued)

FOREIGN PATENT DOCUMENTS

JP 10-095240 A 4/1998
JP 2003-267033 A 9/2003
(Continued)

OTHER PUBLICATIONS

International Search Report dated May 12, 2020 issued in corresponding PCT Application PCT/JP2020/007753.

*Primary Examiner* — Gregory A Blankenship
(74) *Attorney, Agent, or Firm* — NORTON ROSE FULBRIGHT US LLP

(57) ABSTRACT

Provided is a construction machine with which it is possible to shorten a duct for an air conditioning device disposed in a driver's cab, and to secure space for disposing a hydraulic hose, a control valve and the like under the floor of the driver's cab. A hydraulic excavator is provided with a cabin covering an maneuvering unit, a turning frame on which the cabin is mounted, and an air conditioning device for air conditioning the inside of the cabin, wherein: the turning frame includes a cabin installation portion in which the cabin 6 is installed; the cabin installation portion 7a includes a box-shaped right frame having a first opening portion and a second opening portion that communicate with one another; and an air conditioned air discharge opening of the air conditioning device communicates with the first opening portion.

19 Claims, 7 Drawing Sheets

(51) Int. Cl.
  *B62D 33/06* (2006.01)
  *E02F 9/08* (2006.01)
  *E02F 9/16* (2006.01)
(52) U.S. Cl.
  CPC .............. *E02F 9/0858* (2013.01); *E02F 9/16* (2013.01); *B60H 2001/00228* (2013.01); *B60Y 2200/412* (2013.01); *B62D 33/06* (2013.01); *B62D 33/0617* (2013.01)
(58) Field of Classification Search
  CPC .......... B60Y 2200/412; B60H 1/00271; B60H 1/00557; B60H 1/00564; B60H 1/24; B60H 1/241; B60H 1/243; B60H 1/246; B60H 1/0078; B60H 2001/00221; B60H 2001/00228
  USPC ..................................................... 296/190.09
  See application file for complete search history.

(56) References Cited

U.S. PATENT DOCUMENTS

| | | | | |
|---|---|---|---|---|
| 2011/0250832 A1* | 10/2011 | Mayr | .................. | B60H 3/0608 454/237 |
| 2012/0067658 A1* | 3/2012 | Ueda | .................. | B60H 1/00378 180/291 |
| 2012/0086236 A1* | 4/2012 | Nagami | .................. | B60H 1/246 296/190.09 |
| 2012/0134768 A1* | 5/2012 | Kimura | .................. | E02F 9/166 414/687 |
| 2012/0146388 A1* | 6/2012 | Bohme | .................. | B60H 1/246 299/10 |
| 2013/0017048 A1* | 1/2013 | Kimura | .............. | B60H 1/00564 414/687 |
| 2013/0302125 A1* | 11/2013 | Tabeta | .................. | E02F 9/0858 414/687 |
| 2014/0070568 A1* | 3/2014 | Tabeta | .................... | B66C 13/54 296/190.09 |
| 2014/0232130 A1* | 8/2014 | Tanaka | .................. | E02F 9/2004 296/24.3 |
| 2015/0000996 A1* | 1/2015 | Nagami | .................. | E02F 9/163 296/190.08 |
| 2020/0079175 A1* | 3/2020 | Fiocchi | ................ | B60H 3/0608 |
| 2020/0190774 A1* | 6/2020 | Nishigori | ................ | G05G 1/04 |
| 2021/0285183 A1* | 9/2021 | Horii | ....................... | E02F 3/384 |
| 2022/0144040 A1* | 5/2022 | Ishikawa | ................ | E02F 9/16 |
| 2023/0103167 A1* | 3/2023 | Minter | .................. | E02F 9/0858 95/268 |

FOREIGN PATENT DOCUMENTS

| | | |
|---|---|---|
| JP | 2003-326949 A | 11/2003 |
| JP | 2007-245893 A | 9/2007 |
| JP | 2009-255920 A | 11/2009 |
| JP | 2010-280280 A | 12/2010 |

* cited by examiner

CONSTRUCTION MACHINE

CROSS REFERENCES TO RELATED APPLICATIONS

This application is a national stage application pursuant to 35 U.S.C. § 371 of International Application No. PCT/JP2020/007753, filed on Feb. 26, 2020 which claims priority under 35 U.S.C. § 119 to Japanese Patent Application No. 2019-037178 filed on Mar. 1, 2019, the disclosures of which are hereby incorporated by reference in their entireties.

TECHNICAL FIELD

The present invention relates to a construction machine.

BACKGROUND ART

Patent Document 1 below describes, as a technology for improving the workability of connecting a duct to an air conditioning casing while reducing the length of the duct connected to the air conditioning casing in an air conditioning device for a vehicle, a technology of mounting the air conditioning casing on a lateral face side of a seat installed in a driver's cab so that the air conditioning casing is substantially parallel to the front-rear direction of the vehicle. According to this configuration, the air conditioning casing itself serves as a portion of the duct, and the length of the duct to be connected to the air conditioning casing can be shortened compared to the conventional system.

Patent Document 2 below describes, as a technology for increasing the degree of freedom of the installation layout of the duct of the air conditioning device, a technology for providing the main body unit of the air conditioning device in which a heat exchanger is incorporated, under the floor of the driver's cab, and making the duct extending from the main body unit crawl under the floor of the driver's cab and pulling out the duct into the driver's cab.

However, in Patent Document 1, since the duct connected to the air conditioning casing is arranged on the lateral face side of the seat, there is a problem that in a driver's cab having a large window on this lateral face side, the duct hinders a view of the lower lateral side of the vehicle. In addition, since the main body unit of the air conditioning device is disposed under the floor in Patent Document 2, there is a problem that it is difficult to secure a space under the floor for disposing a hydraulic hose, a control valve, and the like, as well as a problem that it is difficult to perform maintenance on the main body unit.

CITATION LIST

Patent Literature

Patent Document 1: Japanese Unexamined Patent Application Publication No. 2003-267033
Patent Document 2: Japanese Unexamined Patent Application Publication No. 2003-326949

DISCLOSURE OF INVENTION

Problems to be Solved by the Invention

The present invention is made in consideration of the above circumstances, and its object is to provide a construction machine in which a duct for an air conditioning device to be disposed in a driver's cab can be shortened, and in which a space for disposing a hydraulic hose and a control valve can be secured under the floor of the driver's cab.

Means for Solving the Problems

A construction machine according to the present invention includes: a cabin covering a maneuvering unit, a frame on which the cabin is mounted, and an air conditioning device that air conditions an interior of the cabin, where the frame includes a cabin installation portion in which the cabin is installed, the cabin installation portion includes a box-shaped structure including a first opening portion and a second opening portion that communicate with each other, and an air-conditioned air outlet of the air conditioning device communicates to the first opening portion or the second opening portion.

Since the cabin installation portion of the frame includes a box-shaped structure including two opening portions, namely, a first opening portion and a second opening portion, that communicate with each other, the frame can be used as an air conditioning duct, and the air conditioning duct to be disposed in the cabin can be shortened. In addition, since the air conditioning duct is not disposed under the floor of the cabin, a space for disposing a hydraulic hose and a control valve can be secured under the floor of the cabin.

A different aspect of the construction machine according to the present invention is that, in the above-described construction machine, the air conditioning device is disposed inside the cabin, the first opening portion and the second opening portion are open toward the cabin, and a floor portion of the cabin includes a third opening portion facing the first opening portion and a fourth opening portion facing the second opening portion.

A still different aspect of the construction machine according to the present invention is that, in the above-described construction machine, the cabin includes a first duct extending from the air-conditioned air outlet of the air conditioning device and connected to the first opening portion through the third opening portion, and a second duct extending from the second opening portion and reaching an air-conditioned air blowoff port through the fourth opening portion.

DESCRIPTION OF EMBODIMENTS

An embodiment of the present invention will be described with reference to the drawings.

Overview of Construction Machine

Figure 1:
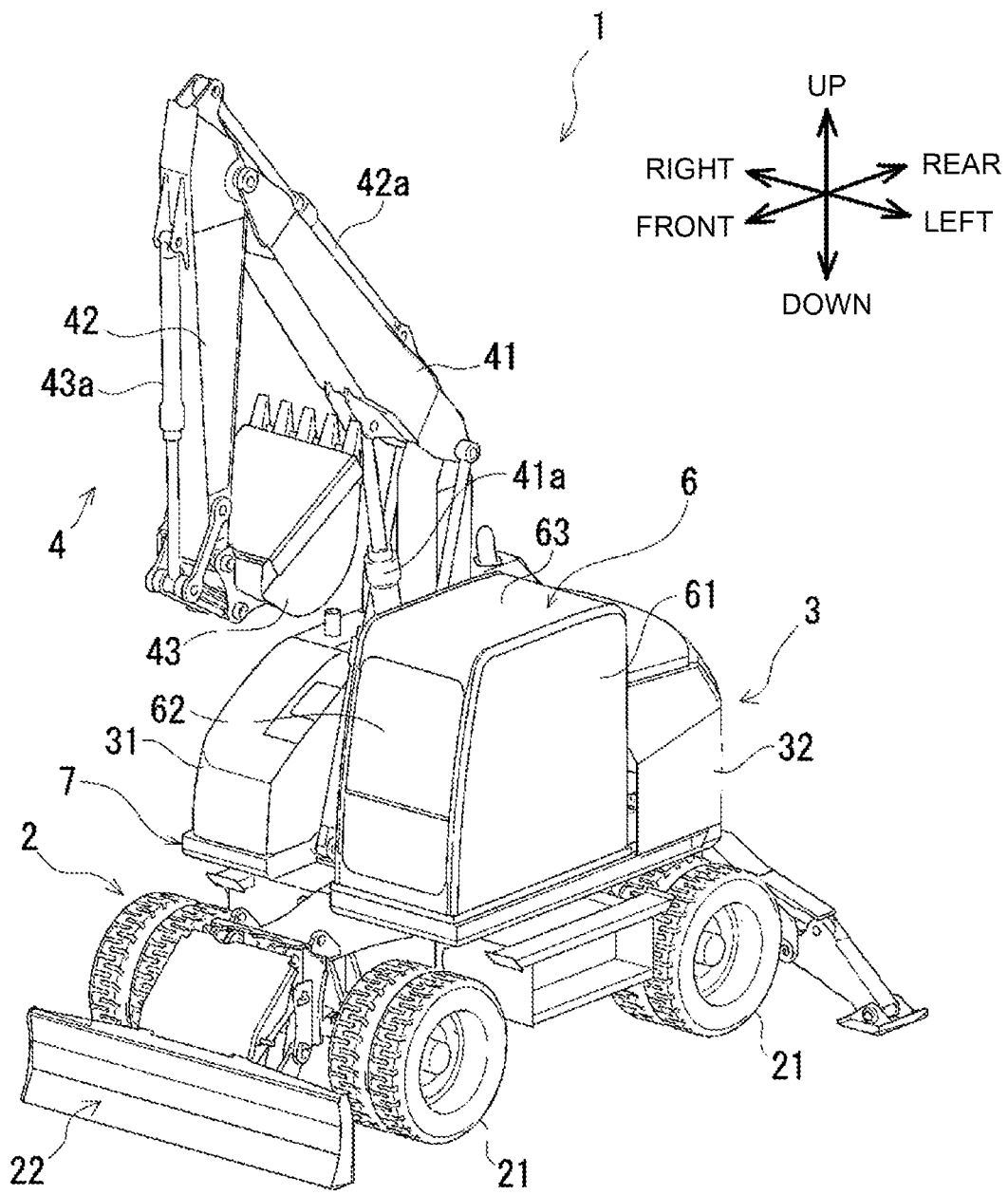
FIG. 1 is a perspective view illustrating an example of a hydraulic excavator according to an embodiment of the present invention.
Figure 2:
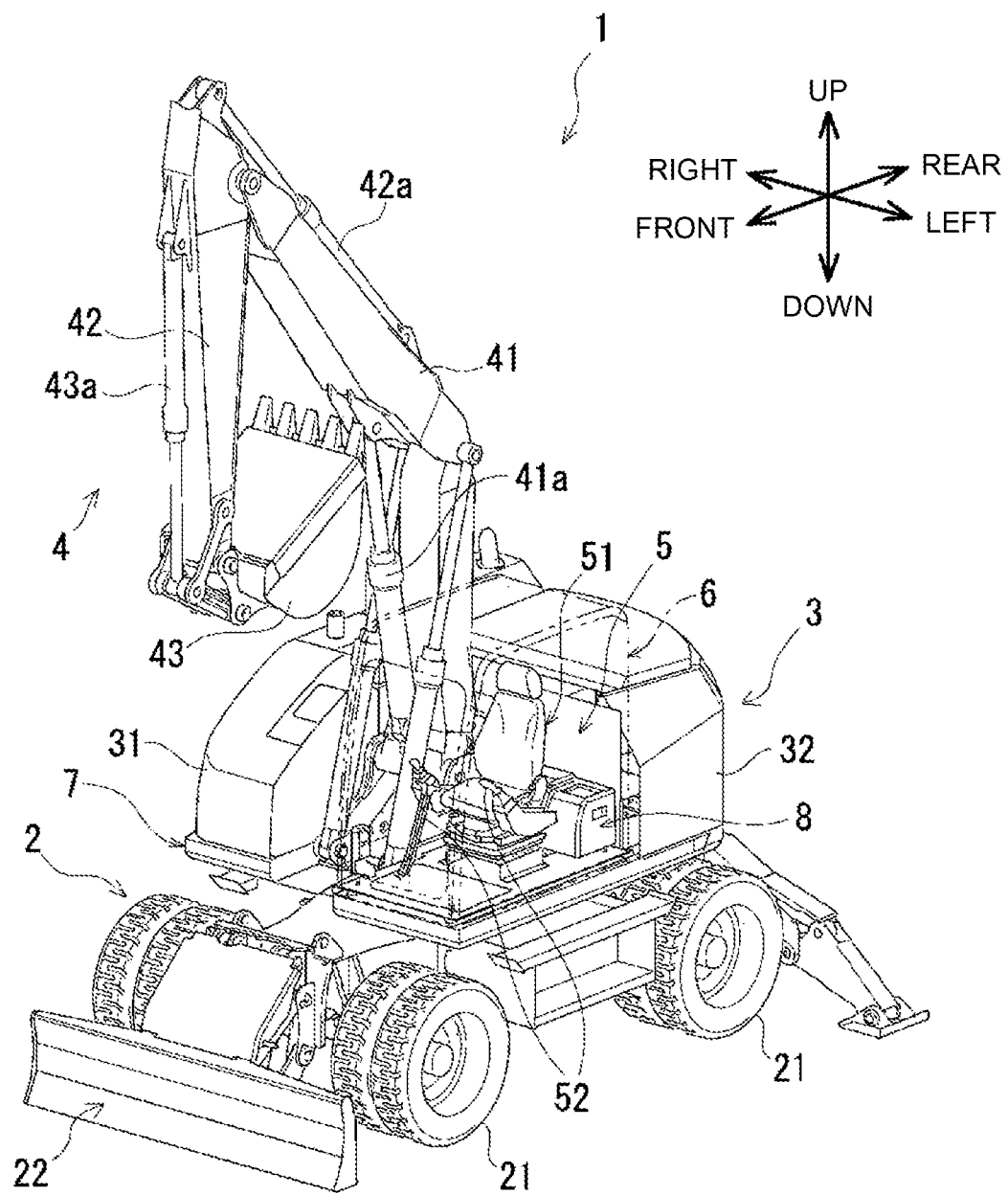
FIG. 2 is a perspective view illustrating an example of a hydraulic excavator according to an embodiment of the present invention.
Figure 3:
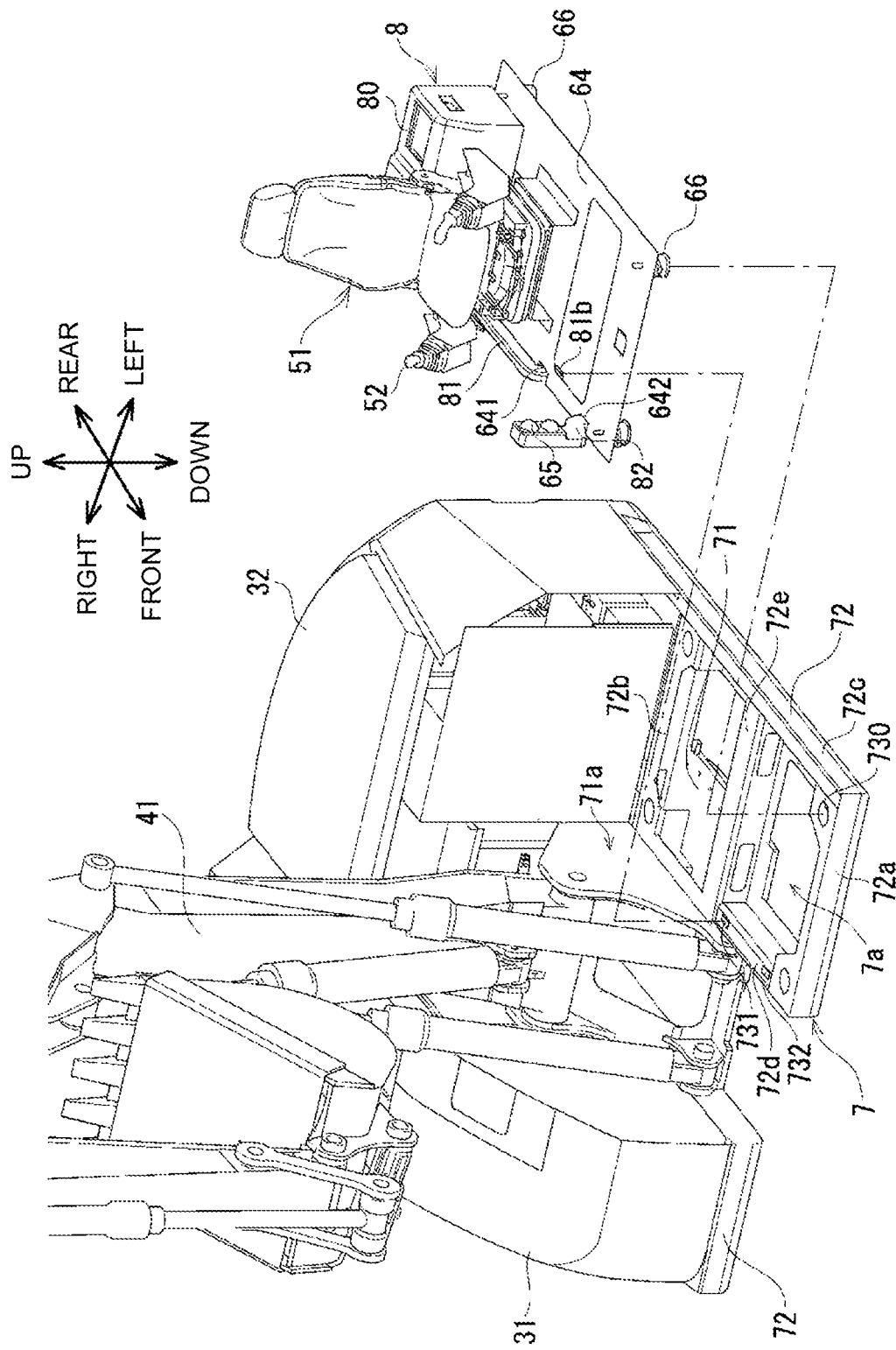
FIG. 3 is a perspective view illustrating a portion of a hydraulic excavator according to an embodiment of the present invention.
Figure 4:
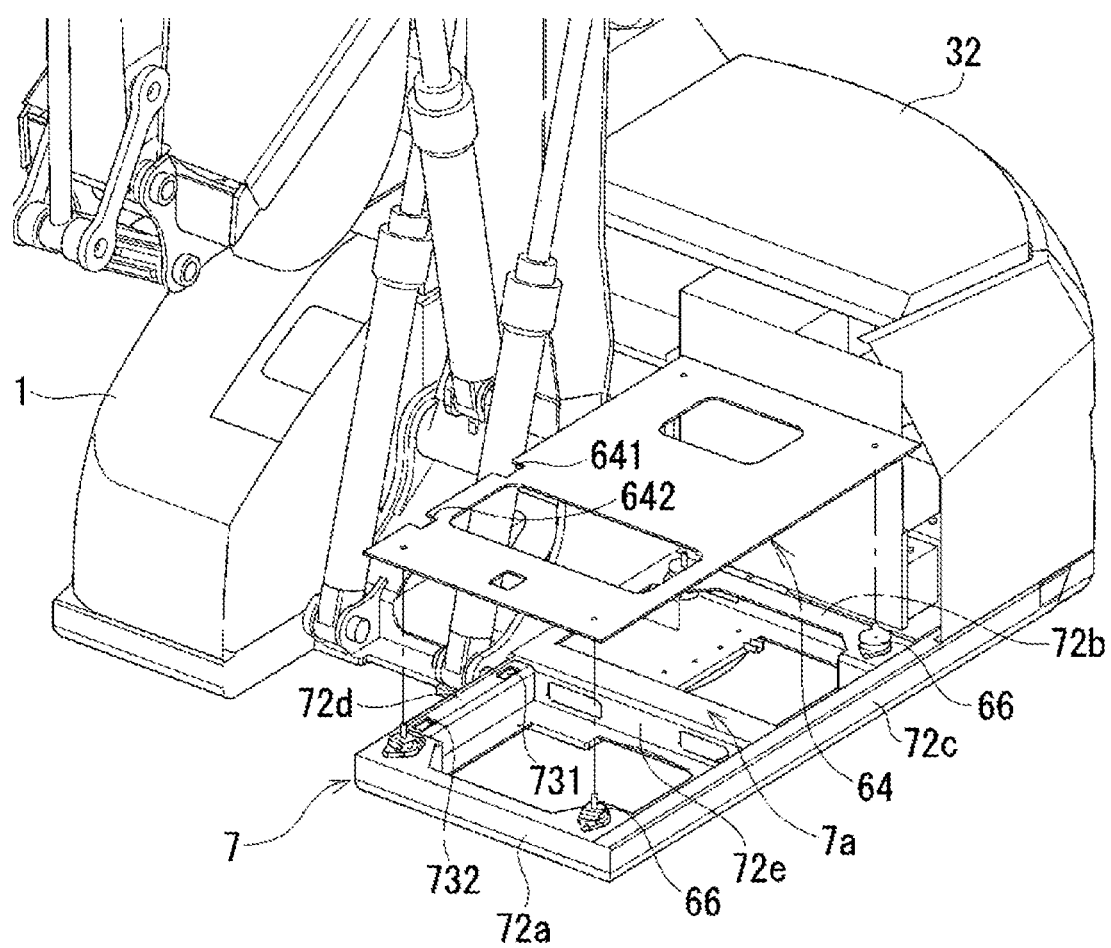
FIG. 4 is a perspective view illustrating a portion of a hydraulic excavator according to an embodiment of the present invention.
Figure 5:
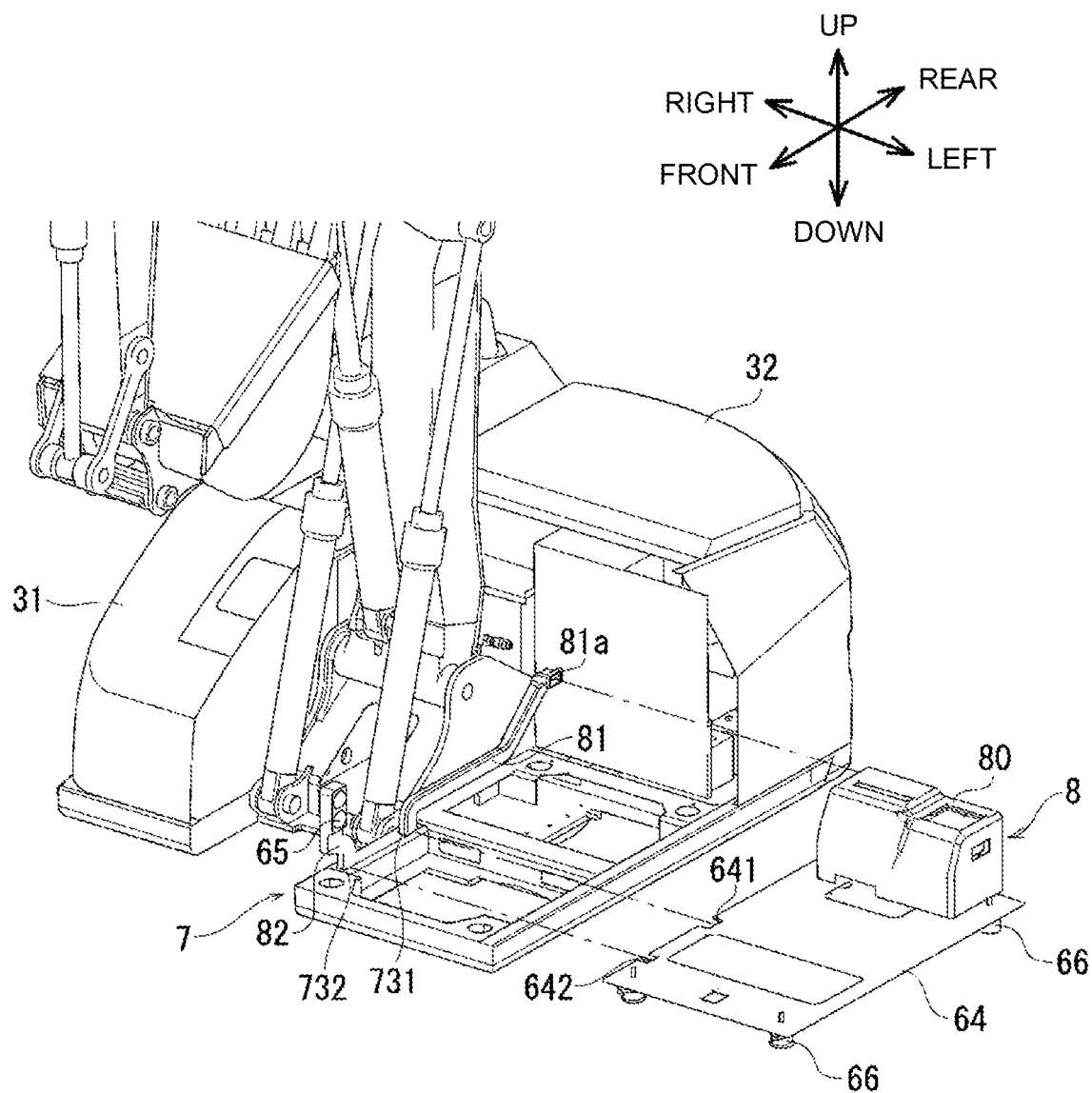
FIG. 5 is a perspective view illustrating a portion of a hydraulic excavator according to an embodiment of the present invention.

A schematic structure of a hydraulic excavator 1 as an example of a construction machine is described. As illustrated in FIG. 1, the hydraulic excavator 1 includes a lower traveling body 2, an upper turning body 3, and a work machine 4.

The lower traveling body 2 is driven as it receives power from an engine (not illustrated), and causes the hydraulic excavator 1 to travel and turn. The lower traveling body 2 includes four wheels 21 at the front, rear, left and right thereof. The lower traveling body 2 also includes a blade 22 as a soil drainage plate.

The upper turning body 3 is structured to be able to perform a turning operation about an axis extending in a vertical direction at a central portion thereof. The engine, a turning motor, a maneuvering unit 5, and the like, are provided in upper turning body 3. The maneuvering unit 5 is equipped with the driving seat 51, various operation levers 52, and the like.

The work machine 4 is driven as it receives power from the engine, and performs excavation work of the soil, for example, in accordance with an operation performed in the maneuvering unit 5. The work machine 4 includes a boom 41, an arm 42, and a bucket 43, and enables an excavation work of the soil, or the like, by driving them independently. The boom 41 is rotationally moved by a boom cylinder 41a which is telescopically movable with a proximal end portion thereof supported by a front portion of the upper turning body 3. The arm 42 is rotationally moved by an arm cylinder 42a which is telescopically movable with a proximal end portion thereof supported by a distal end portion of the boom 41. The bucket 43 is rotationally moved by a bucket cylinder 43a which is telescopically movable with a proximal end portion thereof supported by a distal end portion of the arm 42. The boom cylinder 41a, the arm cylinder 42a, and the bucket cylinder 43a are composed of hydraulic cylinders.

In the upper turning body 3, a cabin 6 covering the maneuvering unit 5 is provided on the left front side on a turning frame 7 which is installed on an upper portion of the lower traveling body 2 to be able to turn left and right, and the work machine 4 and the tank portion 31 are disposed on the right side of cabin 6. The tank portion 31 houses a fuel tank for the engine and an oil tank for the hydraulic cylinder. The engine is mounted at the rear on the turning frame 7, and the bonnet 32 covers the rear and both left and right sides of the engine.

The turning frame 7 is composed of a plate-shaped member 71 and a plurality of rod-shaped members 72. The plate-shaped member 71 includes a boom attachment portion 71a to which the proximal end portion of the boom 41 is attached. The plate-shaped member 71 is also provided with an opening portion to insert a swivel joint and an opening portion to attach the turning motor. In addition, a plurality of other opening portions for drainage and maintenance are formed in the plate-shaped member 71. A plurality of rod-shaped members 72 are disposed on an upper portion of and around the plate-shaped member 71 and serve as structures and reinforcements for the turning frame 7.

The turning frame 7 includes a cabin installation portion 7a in which the cabin 6 is disposed. The cabin installation portion 7a has a rectangular shape in a plan view and is provided on the left front side of the turning frame 7. A mount attachment portion 730 is provided at the four corners of the cabin installation portion 7a. A mount 66, which supports the cabin 6, is attached to mount attachment portion 730.

The cabin installation portion 7a includes a front frame 72a and a rear frame 72b extending in the left-right direction, and a left frame 72c and a right frame 72d extending in the front-rear direction. The perimeter of the bottom of the cabin 6 is disposed on an upper portion of the front frame 72a, the rear frame 72b, the left frame 72c, and the right frame 72d. The cabin installation portion 7a also includes a reinforcing middle frame 72e located between the front frame 72a and the rear frame 72b.

The right frame 72d is composed of square steel tubes and is box-shaped with closed front and rear ends. The right frame 72d is disposed between the front frame 72a and the middle frame 72e, and is closed at the front and rear ends by the front frame 72a and the middle frame 72e. A first opening portion 731 and a second opening portion 732, which are rectangular-shaped, are formed on an upper surface of the right frame 72d. That is, the first opening portion 731 and the second opening portion 732 are open toward the cabin 6. The first opening portion 731 and the second opening portion 732 communicate with each other by a hollow portion in the right frame 72d. This allows the right frame 72d to be used as an air conditioning duct, as described below. When the right frame 72d is used as an air conditioning duct, it is preferable to create a heat-insulating structure by inserting a heat-insulating material inside, or the like.

The cabin 6 includes a left side portion 61 on the left side, a right side portion on the right side (not illustrated in FIG. 1), a front portion 62 provided between the front ends of the left side portion 61 and the right side portion, a rear portion (not illustrated in FIG. 1) provided between the rear ends of the left side portion 61 and the right side portion, a roof 63 provided between the upper ends of the left side portion 61 and the right side portion, and a floor plate 64 provided between the lower ends of the left side portion 61 and the right side portion. The left side portion 61, the right side portion, the front portion 62, and the rear portion are provided with doors and window glass.

The floor plate 64 constitutes a floor portion of the cabin 6. A driving seat 51 is attached to the central portion of the floor plate 64 via a seat mount. The main body unit 80 of the air conditioning device 8, which air conditions the interior of the cabin 6, is disposed on the floor plate 64 behind the driving seat 51. The main body unit 80 includes a compressor, and the like.

A third opening portion 641 and a fourth opening portion 642, which are notched in a substantial U-shape, are formed at the right end of the floor plate 64. The third opening portion 641 is provided on the right side of the driving seat 51 and the fourth opening portion 642 is provided in the right front of the driving seat 51. The third opening portion 641 is formed at a position facing the first opening portion 731 of the cabin installation portion 7a, and the fourth opening portion 642 is formed at a position facing the second opening portion 732 of the cabin installation portion 7a.

The cabin 6 includes a first duct 81 disposed along the right side of the driving seat 51 in the front-rear direction. A proximal end portion 81a of the first duct 81 is connected to the air-conditioned air outlet (not illustrated) of the main body unit 80. After extending forward, the first duct 81 extends downward through the third opening portion 641.

The distal end portion 81*b* of the first duct 81 is connected to the first opening portion 731 of the cabin installation portion 7*a*.

In the front right inside the cabin 6, an air-conditioned air blowoff port 65 (grille) which blows out air from under an occupant' feet is provided. The cabin 6 also includes a second duct 82 extending upward from the second opening portion 732 of the cabin installation portion 7*a*. The second duct 82 extends upward through the fourth opening portion 642 and is connected to the air-conditioned air blowoff port 65.

As described above, the hydraulic excavator 1 of the present embodiment includes a cabin 6 covering the maneuvering unit 5, a turning frame 7 on which the cabin 6 is installed, and an air conditioning device 8 that air conditions the interior of the cabin 6, where the turning frame 7 includes a cabin installation portion 7*a* in which the cabin 6 is installed, the cabin installation portion 7*a* includes a box-shaped right frame 72*d* having a first opening portion 731 and a second opening portion 732 that communicate with each other, and an air-conditioned air outlet of the air conditioning device 8 communicates to the first opening portion 731.

Since the cabin installation portion 7*a* of the turning frame 7 includes a box-shaped right frame 72*d* having two opening portions, namely, a first opening portion 731 and a second opening portion 732, that communicate with each other, the turning frame 7 can be used as an air conditioning duct, and the air conditioning duct to be disposed in the cabin 6 can be shortened. This allows the cabin 6 to include therein a space for installing other equipment. In addition, since the air conditioning duct is not disposed under the floor of the cabin 6, a space for disposing a hydraulic hose and a control valve can be secured under the floor of the cabin 6.

Furthermore, in the present embodiment, by using the right frame 72*d* in the front right of the cabin installation portion 7*a* as an air conditioning duct, it is not necessary to dispose any air conditioning duct in the front lower side inside the cabin 6, so that the view in the front lower side of the cabin 6 can be secured.

In the present embodiment, the air conditioning device 8 is disposed in the cabin 6, the first opening portion 731 and the second opening portion 732 are open toward the cabin 6, and the floor plate 64 of the cabin 6 includes a third opening portion 641 facing the first opening portion 731 and a fourth opening portion 642 facing the second opening portion 732.

Also in the present embodiment, the cabin 6 includes a first duct 81 that extends from the air-conditioned air outlet of the air conditioning device 8 and is connected to the first opening portion 731 through the third opening portion 641, and a second duct 82 that extends from the second opening portion 732 and reaches the air-conditioned air blowoff port 65 through the fourth opening portion 642.

Since the two opening portions of the right frame 72*d* (the first opening portion 731 and the second opening portion 732) and the two opening portions of the floor plate 64 of the cabin 6 (the third opening portion 641 and the fourth opening portion 642) face each other, the air conditioning duct (the first duct 81 and the second duct 82) can be installed at the shortest distance.

Figure 6:
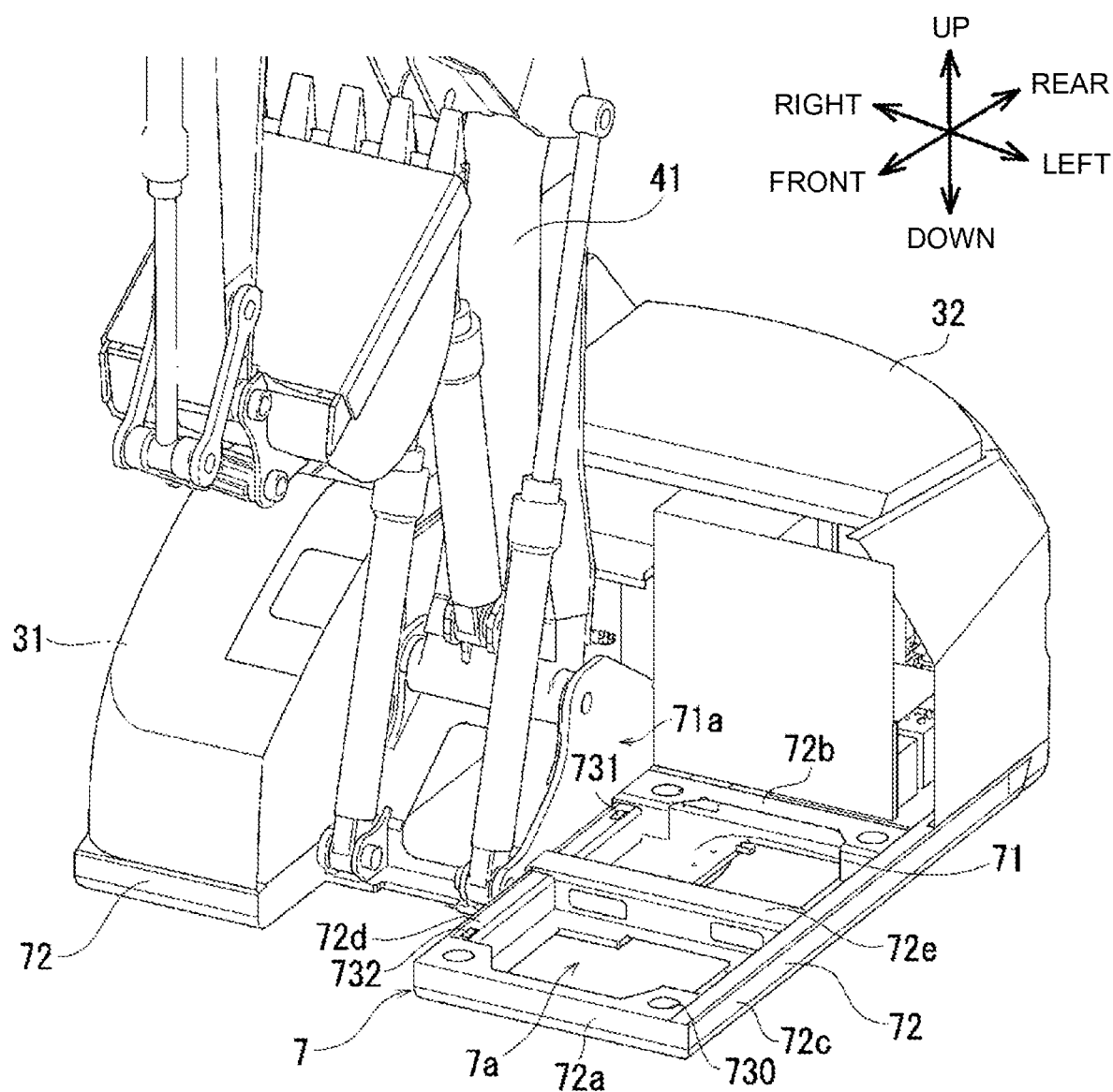
FIG. 6 is a perspective view illustrating a portion of a hydraulic excavator according to a different embodiment of the present invention.

Other Embodiments (1) In the above-described embodiment, the right frame 72*d* is disposed between the front frame 72*a* and the middle frame 72*e*; however, as illustrated in FIG. 6, the right frame 72*d* may be disposed between the front frame 72*a* and the rear frame 72*b*, and the first opening portion 731 may be formed in the vicinity of the rear frame 72*b*. This allows the first duct 81 to be further shortened.

Figure 7:
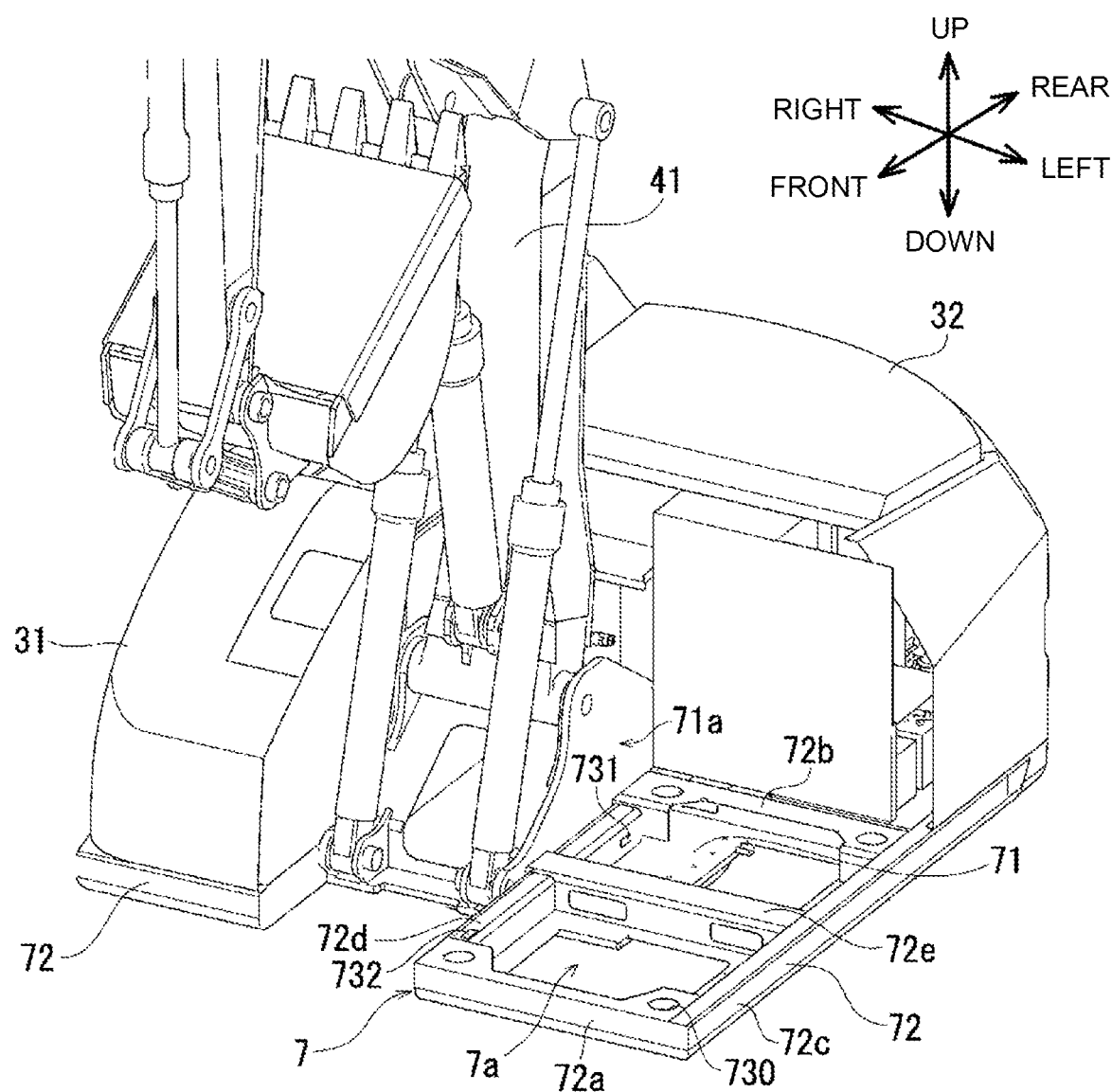
FIG. 7 is a perspective view illustrating a portion of a hydraulic excavator according to a still different embodiment of the present invention.

(2) In the above-described embodiments, the main body unit 80 of the air conditioning device 8 is disposed inside the cabin 6; however, the main body unit 80 may be disposed outside the cabin 6, for example below the floor plate 64. In this case, the first opening portion 731 is formed on the left side of the right frame 72*d* as illustrated in FIG. 7, or on the lower surface of the right frame 72*d*, as appropriate.

(3) The above-described embodiment exemplifies a wheeled hydraulic excavator 1 as an example of a construction machine; however, the construction machine is not limited to the hydraulic excavator 1, and may be any other vehicle, such as a wheeled loader provided with a cabin or air conditioning device.

The present invention is not limited to the aforementioned embodiment(s), and various improvements and modifications can be made without departing from the spirit of the present invention.

DESCRIPTION OF REFERENCE NUMERALS

1 Hydraulic excavator
2 Lower traveling body
21 Wheel
22 Blade
3 Upper turning body
31 Tank portion
32 Bonnet
4 Work machine
41 Boom
41*a* Boom cylinder
42 Arm
42*a* Arm cylinder
43 Bucket
43*a* Bucket cylinder
5 Maneuvering unit
51 Driving seat
52 Operation lever
6 Cabin
61 Left side portion
62 Front portion
63 Roof
64 Floor plate
641 Third opening portion
642 Fourth opening portion
65 Air-conditioned air blowoff port
66 Mount
7 Turning frame
71 Plate-shaped member
71*a* Boom attachment portion
72 Rod-shaped member
72*a* Front frame
72*b* Rear frame
72*c* Left frame
72*d* Right frame
72*e* Middle frame
7*a* Cabin installation portion
730 Mount attachment portion
731 First opening portion
732 Second opening portion
8 Air conditioning device
80 Main body unit
81 First duct
81*a* Proximal end portion of first duct
81*b* Distal end portion of first duct
82 Second duct

The invention claimed is:
1. A construction machine comprising:
   a cabin covering a maneuvering unit,
   a frame on which the cabin is mounted, and
   an air conditioning device configured to air condition an interior of the cabin,
   wherein:
      the frame includes a cabin installation portion on which the cabin is installed,
      the cabin installation portion includes a box-shaped structure including a first opening portion and a second opening portion that communicate with each other,
      an air-conditioned air outlet of the air conditioning device communicates to the first opening portion or the second opening portion, and
      the air conditioning device is disposed inside the cabin.
2. The construction machine according to claim 1, wherein the first opening portion and the second opening portion are open toward the cabin, and a floor portion of the cabin includes a third opening portion facing the first opening portion and a fourth opening portion facing the second opening portion.
3. The construction machine according to claim 2, wherein the cabin includes a first duct extending from the air-conditioned air outlet of the air conditioning device and connected to the first opening portion through the third opening portion, and a second duct extending from the second opening portion and reaching an air-conditioned air blowoff port through the fourth opening portion.
4. The construction machine according to claim 1, wherein the first opening portion and the second opening portion are open toward the cabin.
5. The construction machine according to claim 1, wherein a floor portion of the cabin includes a third opening portion facing the first opening portion and a fourth opening portion facing the second opening portion.
6. The construction machine according to claim 1, wherein the box-shaped structure is formed of a duct for the air conditioning device.
7. The construction machine according to claim 1, wherein a perimeter of the cabin is disposed on an upper surface of the cabin installation portion of the frame.
8. The construction machine according to claim 1, wherein the cabin installation portion of the frame includes a front frame member, a rear frame member, a left frame member, and a right frame member.
9. The construction machine according to claim 8, wherein the right frame member includes the box-shaped structure.
10. The construction machine according to claim 8, wherein the front frame member, the rear frame member, the left frame member, and the right frame member define a rectangular shape in a plan view.
11. The construction machine according to claim 1, further comprising one or more mount attachment portions.
12. The construction machine according to claim 11, wherein the cabin is coupled to the cabin installation portion by the one or more mount attachment portions.
13. The construction machine according to claim 1, wherein an entirety of the box-shaped structure is positioned lower than the air conditioning device.
14. A construction machine comprising:
   a cabin covering a maneuvering unit,
   a frame on which the cabin is mounted, and
   an air conditioning device configured to air condition an interior of the cabin,
   wherein:
      the frame includes a cabin installation portion on which the cabin is installed,
      the cabin installation portion includes a box-shaped structure including a first opening portion and a second opening portion that communicate with each other,
      an air-conditioned air outlet of the air conditioning device communicates to the first opening portion or the second opening portion, and
      the first opening portion and the second opening portion are open toward the cabin.
15. The construction machine according to claim 14, wherein a perimeter of the cabin is disposed on an upper surface of the cabin installation portion of the frame.
16. The construction machine according to claim 14, wherein the cabin installation portion of the frame includes a front frame member, a rear frame member, a left frame member, and a right frame member.
17. A construction machine comprising:
   a cabin covering a maneuvering unit,
   a frame on which the cabin is mounted, and
   an air conditioning device configured to air condition an interior of the cabin,
   wherein:
      the frame includes a cabin installation portion on which the cabin is installed,
      the cabin installation portion includes a box-shaped structure including a first opening portion and a second opening portion that communicate with each other,
      a floor portion of the cabin includes a third opening portion facing the first opening portion and a fourth opening portion facing the second opening portion, and
      an air-conditioned air outlet of the air conditioning device communicates to the first opening portion or the second opening portion.
18. The construction machine according to claim 17, wherein the cabin includes a duct extending from the air-conditioned air outlet of the air conditioning device and connected to the first opening portion through the third opening portion.
19. The construction machine according to claim 17, wherein the cabin includes a duct extending from the second opening portion and reaching an air-conditioned air blowoff port through the fourth opening portion.

* * * * *